United States Patent
Nozaki

(10) Patent No.: US 6,683,610 B1
(45) Date of Patent: Jan. 27, 2004

(54) VERIFICATION DEVICE FOR AN EFFECTIVE VISUAL FIELD, METHOD FOR VERIFYING THE EFFECTIVE VISUAL FIELD, AND PROGRAMMING MEDIUM FOR VERIFYING THE EFFECTIVE VISUAL FIELD

(75) Inventor: Naoyuki Nozaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/510,168

(22) Filed: Feb. 22, 2000

(30) Foreign Application Priority Data

Mar. 1, 1999 (JP) .......................................... 11-052212

(51) Int. Cl.$^7$ .............................................. G06T 15/10
(52) U.S. Cl. ..................................................... 345/427
(58) Field of Search ................................. 345/419, 427, 345/619, 856, 52, 848; 348/348

(56) References Cited

U.S. PATENT DOCUMENTS 5,850,352 A  * 12/1998  Moezzi et al. ............... 345/419
6,028,608 A  *  2/2000  Jenkins ........................ 345/619
6,124,843 A  *  9/2000  Kodama ....................... 345/856
6,130,672 A  * 10/2000  Yamazaki et al. ........... 345/427
6,400,364 B1 *  6/2002  Akisada et al. .............. 345/427

FOREIGN PATENT DOCUMENTS

JP      10240791 A      9/1998

* cited by examiner

Primary Examiner—Mark Zimmerman
Assistant Examiner—Huedung X. Cao
(74) Attorney, Agent, or Firm—Staas & Halsey LLP

(57) ABSTRACT

A verification device of an effective visual field range of a display takes into account a use environment. The device includes a composing unit composing a use environment related to a verifying object of a displaying device in a virtual three-dimensional space of a computer, taking into account the use environment thereof, a setting unit setting an effective visual field of a verifying object of the displaying device by the use environment composed by the composing unit, and a display displaying visually the effective visual field set by the setting unit as an effective visual field on the displaying screen.

28 Claims, 26 Drawing Sheets

FIG. 3

| USED ENVIRONMENT NAME | PARTS ID HUMAN BODY MODEL ID | POSITION, POSE, JOINT INFORMATION | DISPLAY ATTRIBUTE | RESTRICTION ATTRIBUTE | ... | POINTER FOR FORM-HUMAN BODY MODEL FILE |
|---|---|---|---|---|---|---|
| INSIDE OF THE SHINKANSEN | PARTS 1 | xxxxx | xxxx | xxxx | ... | xxxxxxxxx |
| | PARTS 2 | xxxxx | xxxx | xxxx | ... | xxxxxxxxx |
| | PARTS 3 | xxxxx | xxxx | xxxx | ... | xxxxxxxxx |
| | : | : | : | : | : | : |
| | HUMAN BODY 1 | xxxxx | xxxx | xxxx | ... | xxxxxxxxx |
| | : | : | : | : | : | : |

FIG. 4

| PARTS NAME | FORM INFORMATION |
|---|---|
| PARTS 1 | xxxxxxxxxxxxxxxx |
| PARTS 2 | xxxxxxxxxxxxxxxx |
| ..... | ..... |

FIG. 5

| BASIC POSE | HUMAN BODY MODEL NAME | JOINT INFORMATION |
|---|---|---|
| UPRIGHT POSE | JAPANESE-MALE-MEAN VALUE | xxxxxxxxxxxxxx |
| | JAPANESE-FEMALE-MEAN VALUE | xxxxxxxxxxxxxx |
| | FOREIGNER-MALE-MEAN VALUE | xxxxxxxxxxxxxx |
| | FOREIGNER-FEMALE-MEAN VALUE | xxxxxxxxxxxxxx |
| | ... | ... |
| SEATED POSE | (COMMON TO ALL HUMAN BODY MODELS) | xxxxxxxxxxxxxx |
| SEATED UPRIGHT POSE | (COMMON TO ALL HUMAN BODY MODELS) | xxxxxxxxxxxxxx |
| ...... | | |

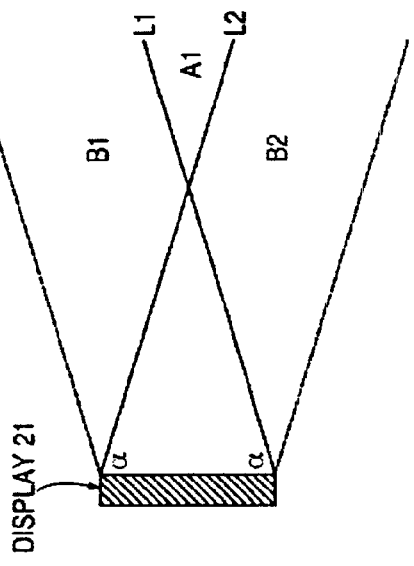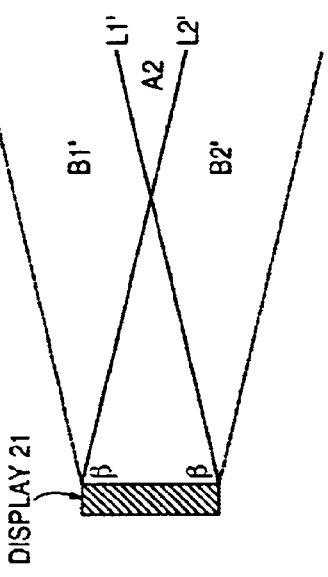

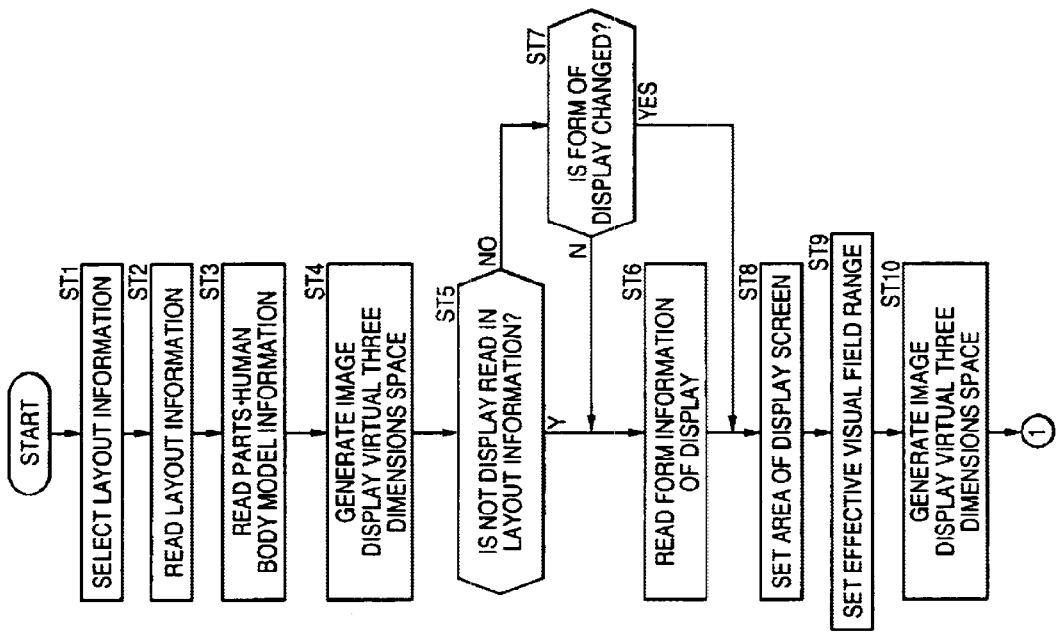

VERIFICATION DEVICE FOR AN EFFECTIVE VISUAL FIELD, METHOD FOR VERIFYING THE EFFECTIVE VISUAL FIELD, AND PROGRAMMING MEDIUM FOR VERIFYING THE EFFECTIVE VISUAL FIELD

BACKGROUND OF THE INVENTION

1. Field of the Invention

The present invention relates to a verification device for an effective visual field of a display, a method for verifying the effective visual field, and a medium storing a program verifying the effective visual field

2. Description of the Related Art

Mobile computers are becoming more generalized. However, it is necessary in the design of the mobile computer to plan specifically each mobile computer so as to fit it to the specific use.

As liquid crystal displays are designed to be thinner in thickness and lower in power than CRT displays, crystal displays are used in the mobile computer. But the displays have a problem in that their visual field angles are narrower than CRT displays. So wide visual field angle displays for mounting on the mobile computer have been developed.

On the contrary, there is a requirement that the screen is not seen by another person, in view of security and privacy. From that point of view, a requirement of displays having a narrower angle of the visual field is raised.

For the background problem, in the prior art, the effective visual field of the display for mounting the mobile computer is investigated by CAD drawings on which lines showing boundaries of the effective visual field of the display for mounting on the computer are drawn.

Investigations concerning a real use environment are not accomplished in the prior art, causing a problem that the design of the visual field angle of the display in the real use environment is not realized. Therefore the design of the visual field angle of a display fitting the use of a mobile computer is not fully realized.

For example, when designing a mobile computer for use as a banking terminal, the effective visual field range in the real use environment as the banking terminal should be investigated. But, in the prior art, the investigations from that view point are not conducted.

The present invention is developed to solve the above mentioned problem.

SUMMARY OF THE INVENTION

An object of the invention is to provide a verification device verifying the effective visual field of a display.

Another object of the invention is to provide a verification method for verifying the effective visual field of a display.

Another object of the invention is to provide a medium storing a program verifying an effective visual field of a display.

Objects and advantages of the present invention are achieved in accordance with embodiments of the present invention with a verification device verifying the effective visual field of a display, which comprises composing means for composing a use environment for the display by a computer a verifying object, setting means for determining an effective visual field of a verifying object of the display in the use environment composed by the composing means, and displaying means for displaying visually the effective visual field determined by the setting means on a display screen.

In accordance with embodiments of the present invention, the verification device verifying the effective visual field of a display comprises a composing unit composing a use environment for the display by a computer a verifying object, setting means for determining an effective visual field of a verifying object of the display in the use environment composed by the composing unit, and a displaying unit displaying visually the effective visual field determined by the setting unit on a display screen.

Moreover, in accordance with embodiments of the present invention, the verification method for verifying the effective visual field of a display comprises composing a use environment for a display of a verification object of a displaying device in a virtual three dimension space by a computer, setting an effective visual field of the display of the verification object in the use environment, and displaying visually on a display screen the effective visual field.

Moreover, in accordance with embodiments of the present invention, a medium stores a program verifying an effective visual field of a display. The program comprises a process composing a use environment for a display of a verification object by a computer, a process setting an effective visual field of a display of a verification object in the use environment composed by the composing process, and a process displaying visually on a display screen the effective visual field determined by the setting process.

Like this, by using the present invention, the investigation of the effective visual field range of the display of the verification object may be realized, considering the real use environment.

Further, as an example, arranging the human body model, the composing means composes the use environment in the process. In the case, by operating the arranged position or pose of the human body model, or by exchanging the form of the human body without changing the position or pose, the relation between the human body model and the effective visual field range of the display of the verification object may be implemented.

Additionally the implementing method of the present invention determines the visual field image that the human body model observes for the display of the verification object based on the arrangement of the human body model, and displays the determined visual field image on the display screen of a terminal, indicating clearly that the visual field image is within the effective visual field range or not within the effective visual field range. In this way, the relationship between the human body model and the effective field of the display of the verification object is investigated specifically.

BRIEF DESCRIPTION OF THE DRAWINGS

These together with other objects and advantages which will be subsequently apparent, reside in the details of construction and operation as more fully hereinafter described and claimed, reference being had to the accompanying drawings forming a part hereof, wherein like numerals refer to like parts throughout.

FIG. 3 shows an explanatory drawing of a layout information file.

FIG. 4 shows a form information file.

FIG. 5 shows a human body model information file.

FIG. 7A shows an upper view of the display of an explanatory visual field range of a display FIG. 7B shows a side view of the display of an explanatory visual field range of a display.

FIG. 8 shows a process flow of a verification program of the effective visual field range.

DESCRIPTION OF THE PREFERRED EMBODIMENT

Figure 1:
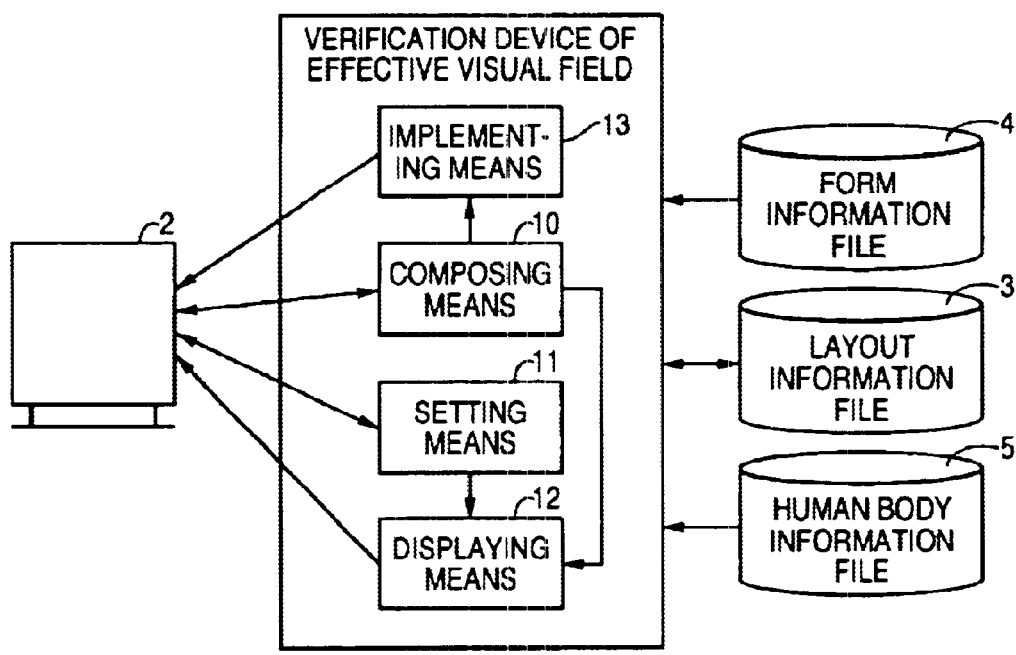
FIG. 1 shows principle components of the present invention.

FIG. 1 shows the principle components of the present invention.

In FIG. 1, the verification device 1 of the effective visual verifies the effective visual field range of the display. Terminal 2 is connected to the verification device 1 of the effective visual field, and is used as a means for interfacing with a user. Layout information file 3 is connected to the verification device of the effective visual field 1 and stores the layout information of the use environment. Form information file 4 is connected to the verification device of the effective visual field 1 and stores forms of components arranged in the use environment. Human body model information file 5 is connected to the verification device of the effective visual field 1 and stores information of forms of human bodies The verification device of the effective visual field 1 of the present invention comprises composing means 10, setting means 11, display means 12 and implementing means 13.

The composing means 10 composes a use environment of a verifying object in a virtual three-dimensional space by a computer, and displays it on a display screen of the terminal 2. In operation, the use environment may be composed by arranging the human body model, and further the user may operate by arranging the position or pose of the human body model, or by exchanging the form of the human body model without changing the arranged position or pose.

Composing the use environment registered in the layout information file 3, the composing means 10 accesses the layout information file 3 by the registered name of the use environment to obtain the layout information, reads out the parts or the human model directed by the layout information from the layout information file 3 to arrange them in the position or pose directed by the layout information, and arranges the display of the verification object. Like this, the composing means 10 composes the use environment.

Alternatively, when composing a use environment which is not registered in the layout information file 3, parts/human body models composing the use environment are decided upon, and the composing means 10 reads out the parts and the human body models from the form information file 5 and the human body information file 4 to decide and arrange the position and the pose, and arranges the display of the verification object. Like this, the use environment is composed.

The setting means 11 determines the effective visual field of the display of the verification object composed by the composing means 10 by interfacing with a user through a screen for setting the visual field angle.

The displaying means 12 shows visually the effective visual field range defined by the setting means 11. As examples, colors or densities for displaying the effective visual field may be changed according to the distance from the display of the verification object. In addition to this, a color or a brightness may be displayed according to a display brightness of the display of the verification object determined by the setting means.

The implementing means 13 determines the visual image that the human body model looks to for the display of the verification object arranged in the use environment, and displays it on the display screen of the terminal 2. As an example, in this case, the visual field may be displayed, indicating whether it is within the effective visual field range or not within the effective visual field range.

The function of the verification device of the effective visual field 1 of the present invention is realized concretely by programs, and the programs are stored on a diskette or on a disk of server. The programs are installed in the verification device of the effective visual field 1 and are loaded into a memory. Like this, the present invention is realized.

By the verification device of the effective visual field 1 of the present invention composed as explained herein above, composing means 10 composes the use environment of the display of the verification object in a virtual three-dimensional space of a computer on a display screen of a terminal 2, and displays it. By interfacing with a user by use of the display of the use environment, the setting means 11 determines the effective visual field of the display of the verification object in the determined use environment. Receiving the determined effective visual field range, the displaying means 12 displays the determined effective visual field range on a display screen of the terminal 2 for displaying the use environment.

As explained above, by using the verification device of the effective visual field range of the display, the investigation of the effective visual field of the display of the verification object may be implemented, under conditions considering the real use environment.

In the process, as an example, arranging the human body model, the composing means 10 composes the use environment. In that case, by operating the arranged position or pose of the human body model, or by exchanging the form of the human body without changing the position or pose, the investigation of the relation between the human body model and the effective visual field range of the display of the verification object.

Further the implementing means 13 determines the visual field image that the human body model looks to for display of the verification object based on the arrangement of the human body model, and displays the determined visual field image on the display screen of the terminal 2, indicating clearly that the visual field image is within the effective visual field range or not within the effective visual field. By this way, the investigation of relationship between the human body model and the effective field of the display of the verification object is implemented specifically.

In the following, the detailed explanation of the present invention is presented according to the following embodiments.

Figure 2:
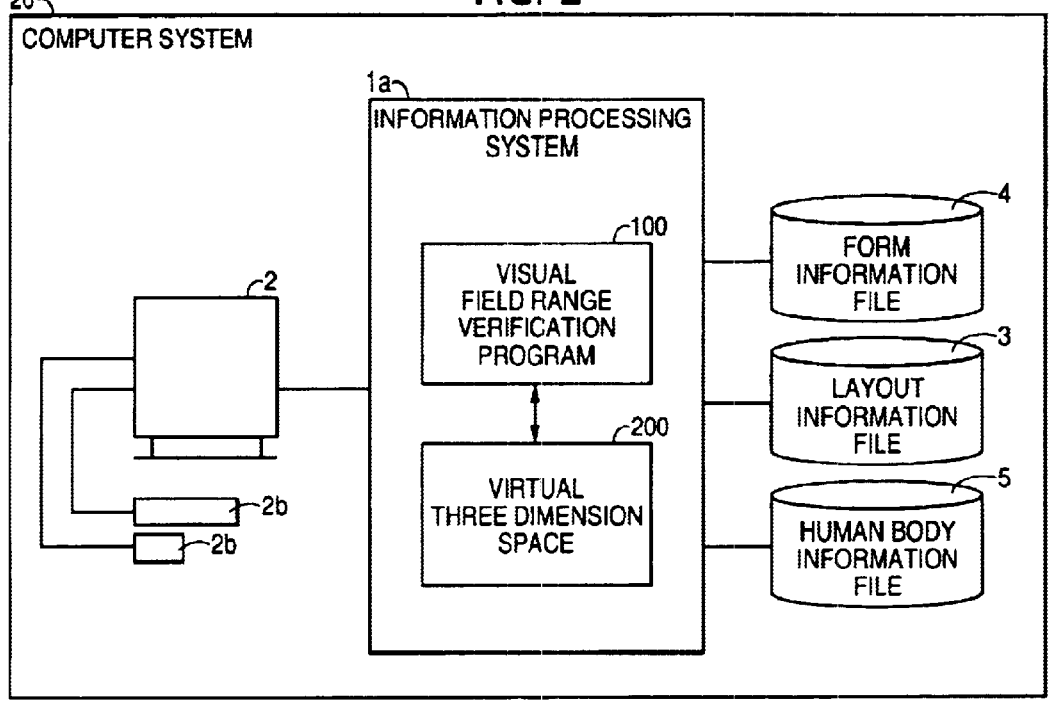
FIG. 2 shows an embodiment of the present invention.

In FIG. 2, an example of a computer system 20 of the present invention is shown.

As shown in FIG. 2, the computer system 20 of the present invention comprises an information processing system 1a. The information processing system 1a, which includes a processor and its internal memory, of the present invention comprises a visual field range verification program 100 and a virtual three-dimensional space 200 of the present invention. The computer system 20 also includes the terminal 2, and the terminal 2 includes a mouse 2a and a keyboard 2b. In addition, the computer system 20 includes the layout information file 3, and the form information file 4, and the human body model information file 5. The verification program of the effective visual field range 100 embodies the present invention (including the composing means 10, the setting means 11, the displaying means 12, and the implementing means 13) as explained herein, and the virtual three-dimensional space 200 is composed on the information processing system 1a. Moreover, the visual field range verification program 100 and the virtual three-dimensional space are stored in a storage device (not shown in FIG. 2).

The layout information file 3 stores the layout information of the composed use environment, and as shown in FIG. 3, it stores the ID of parts or human body models arranged in the use environment, the position and pose of the parts and human body model, display attributes of the parts and human body model (displaying colors, the necessity of a half transparent display, the transparency rate, etc.), restriction information of the parts and the human body models (the range of the parts, the restriction of the moving range of the joint), and pointers of the parts to the form information (pointers to the form information file 4) etc.

Also, the form information file 4 shown in FIG. 4 stores the form information of parts (contained parts for arranging besides the parts actually arranged) in the use environment, and stores the form information of the parts by each part.

Also, the human model information file 5 stores the form information of the human body model (containing parts for arranging besides the parts actually arranged) arranged in the use environment, and as shown in FIG. 5, stores joint information of (a length between joints and joint angle for upright pose, and joint angles for other poses) various poses of the human body by each prepared pose. Now the joint angles managed by the poses filed as default except the upright pose are common to all human body models.

On the other hand, the verification program of the effective visual field 100 is installed through diskettes or a network, composes the use environment of the display of the verification object in a three-dimensional space 200 in the computer system, and displays it on the display screen of the terminal 2. Moreover the verification program 100 determines the effective visual field range of the display of the verification object to display visually on the display screen, and processes the verification of the effective visual field of the display.

Figure 6A:
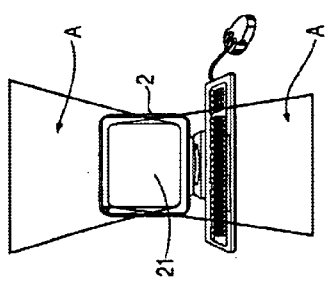
FIG. 6A shows an explanation of a visual field range of a display seen from the front.
Figure 6B:
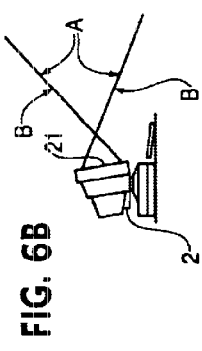
FIG. 6B shows an explanation of a visual field range of a display seen from the side.
Figure 6C:
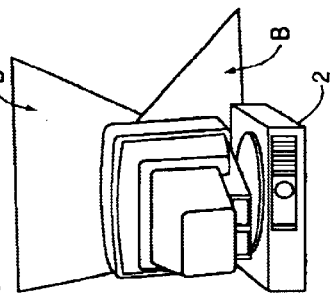
FIG. 6C shows an explanation of a visual field range of a display seen from the rear.
Figure 9:
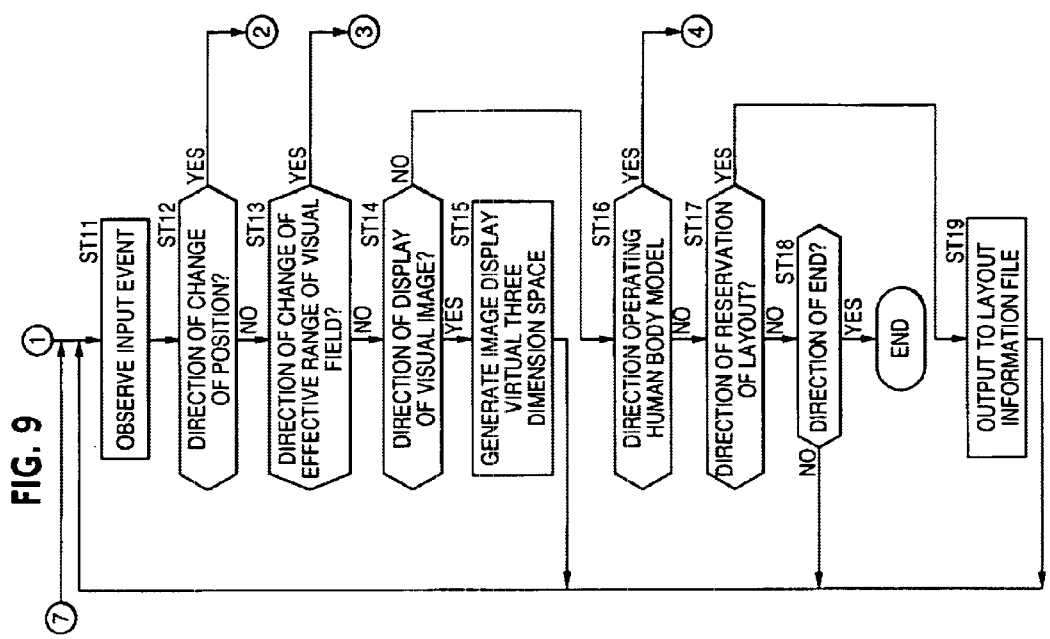
FIG. 9 shows a process flow of a verification program of the effective visual field range.

That is the display device 2 is characterized by the effective visual field range as shown FIGS. 6A, 6B and 6C. In FIGS. 6A, 6B and 6C, the area A shows the effective visual field range, and the area B shows the outside of the effective visual field range. When a user's eye is within the effective visual field range, the user can see clearly the whole display 21 of the display device 2. When a user's eye is within the area B, the user cannot see clearly the whole display 21. The verification of the effective visual field of the display is implemented by showing where the effective visual field range is located in the use environment on the display screen.

FIG. 7A shows the display 21 shown from the upper side. L1 is a boundary of the effective visual field range in the case of viewing the display 21 from the right side. The area B1 is in the right side of L1 for the display 21. When a user's eye is within the area B1, the user cannot see clearly the whole display 21. L2 is a boundary of the effective visual field range in the case of viewing the display 21 from the left side. The area B2 is in the right side of L2 for the display 21. When a user eye is within the area B1, the user cannot see clearly wholly the display 21. So the common area A1 is the effective visual field range in case seeing from the right side and left side.

FIG. 7B shows the display 21 shown from a side of the display 21. L1' is a boundary of the effective visual field range in the case of viewing the display 21 from the upper side. The area B1' is in the upper side of L1' for the display 21. When a user eye is within the area B1' the user cannot see clearly the whole display 21. L2' is a boundary of the effective visual field range in the case of viewing the display 21 from the lower side. The area B2' is in the lower side of L2' for the display 21. When a user's eye is within the area B1' the user cannot see clearly the whole display 21. So the common area A2 is the effective visual field range in the case of viewing from the upper side and lower side.

The area A in FIGS. 6A, 6B and 6C is a common range of the area A1 and A2.

When the use environment used for a verification is registered in the layout information file 3, the verification program 100 of the effective visual field range reads it for the verification to create the use environment. But, in case there is no use environment registered in the layout information file 3, the verification program 100 creates newly the use environment based on elements for composing the environment input by a user who interfaces with the terminal 2, or composes it from the user environment read from the layout information file 3 by user interfacing with the terminal 2.

FIG. 8 to FIG. 13 show an example of processing flow implemented by the verification program 100 of the effective visual field of the present invention. According to the processing flow, the present invention is explained in detail in the following.

Figure 14:
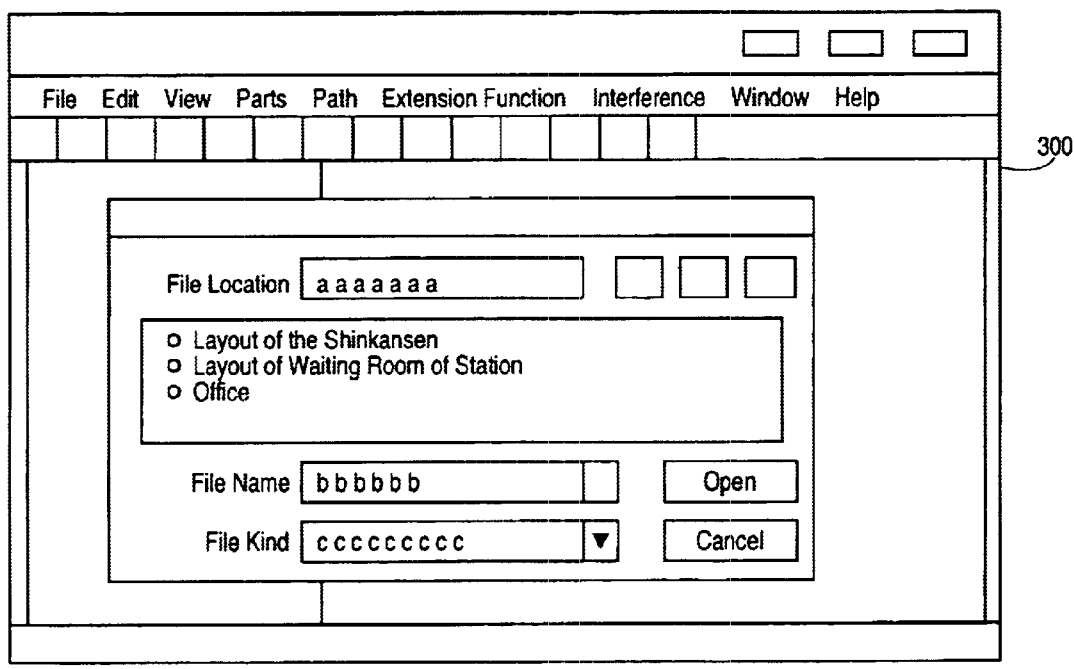
FIG. 14 shows an explanation drawing of a display screen.

When the verification program of the effective visual field range 100 is started by a user, at first it displays a selection screen of the layout information 300 shown in FIG. 14, at step ST1 in the process flow shown in FIG. 8~FIG. 13, and chooses the layout information for the verification of the effective visual field range of the display from the layout information (the use environment ) stores in the layout information file 3 by interfacing with the user.

Next, at step ST2 the selected layout information is read out from the layout information file 3. Then at step ST3, the form information of the parts directed by the read layout information is read out from the form information file 4. In the case that the human model information exists in the layout information read out, the human body information (upright form information) is read out from the human body model information file 5.

Moreover, at step ST4, the use environment of the display is composed in the virtual three-dimensional space 200 by arranging the parts read at step ST3 with operating the pose, or arranging the human body model with operating the joint angle of the human body model read at step ST3, according to the position and pose of the layout information read in at step ST4, and the use environment is displayed on the display screen of the terminal 2. For example, the use environment 305 in a train of the Shinkansen line as shown in FIG. 15 is composed, and displayed on a display screen of the terminal 2.

Figure 15:
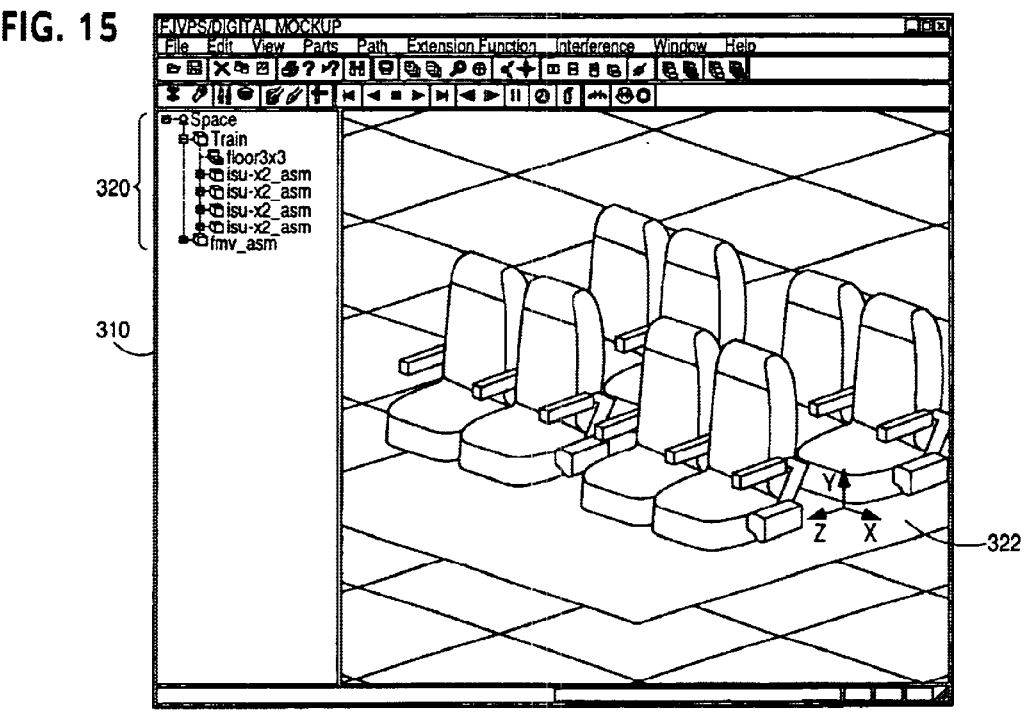
FIG. 15 shows an explanation drawing of a display screen.

A tree structure 300 displayed on the display screen 310 in FIG. 15 shows relations between parents parts and children parts displayed on the display screen 310. The tree structure 320 shown in FIG. 15 shows a structure of five parts of the layout information of "train" and includes four chairs "isu-x2-asm" and floor "floor" 3×3 (3×3 shows a division number). When a user operates to move a part in the tree structure, another four parts move together as an assemble part of "train" according to the parent children relation.

Next, at step ST5 shown in FIG. 8, it is determined whether the display of the verification object is composed or not in the use environment composed by the layout information. When it is determined that the display has not been composed, a menu screen of all names of the displays stored in the form information file 4 is displayed at step ST6 in FIG. 8. A display of the verification object is chosen by information directed by the user who interfaces with the terminal 2. Further, form information of the selected display is read from the form information file 4, and the position and pose are decided by dialoguing to put the display (33 1)of the verification object in the composed use environment.

On the other hand, at step ST5 when determining the display (331 in FIG. 16) has been composed, it is determined in ST7 whether changing the form of the display is directed or not, and when determining the direction of the change, the form of the display is changed to a new form by implementing the process of the step ST6. On the other hand, when not determining the direction of the change, the process of the step ST6 is not implemented.

Figure 16:
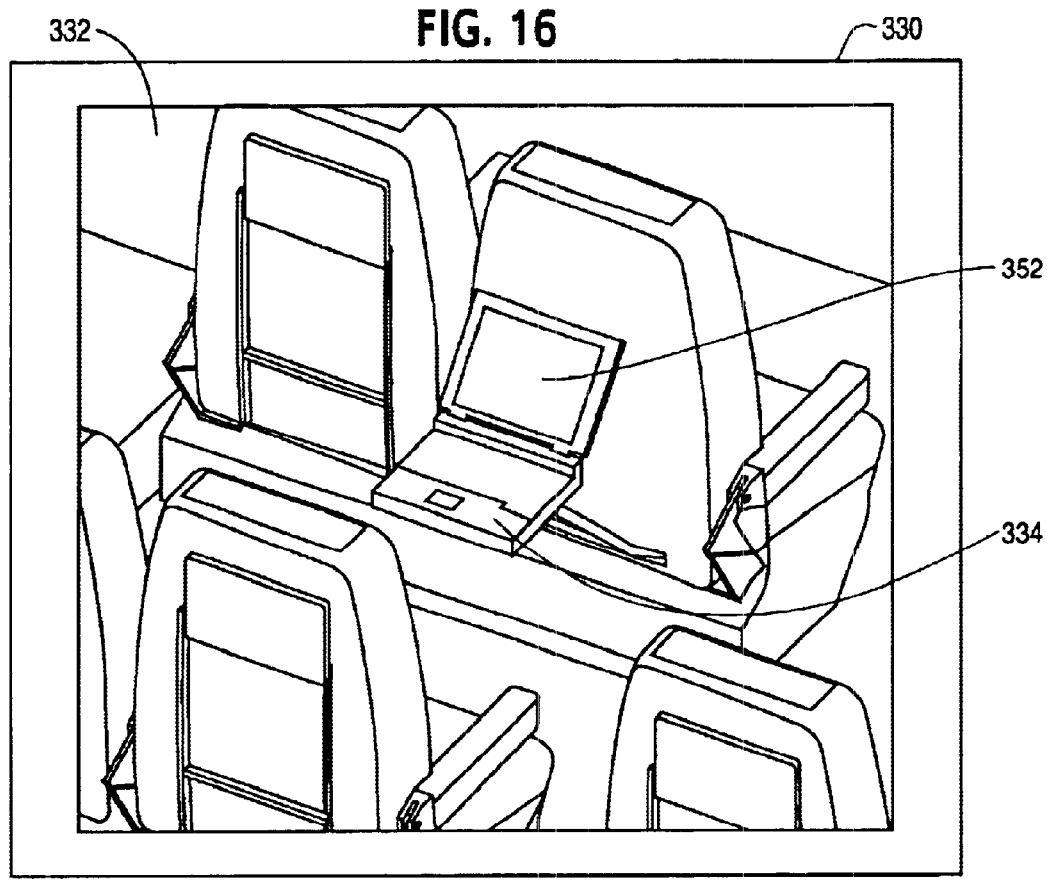
FIG. 16 shows an explanation drawing of a display screen.

Like this, the use environment 332 (see FIG. 16) for using the display 331 in which the display 331 of the verification object is arranged as shown in FIG. 16, and it is displayed on the displaying screen 330 of the terminal 2.

Further a screen 340 for setting the display of the verification object is opened at step ST8 of FIG. 8 according to the request for setting the display issued by the user, and a screen are clicked by is displayed on the display screen 340 of the terminal 2, and a display 341 of the display of the verification object is decided by user interfacing with the screen 340 of the terminal 2. That is, by user interfacing with the display screen 340, an exact screen area 341 excepted the outer region of the device of the verification device is extracted and displayed.

Figure 17:
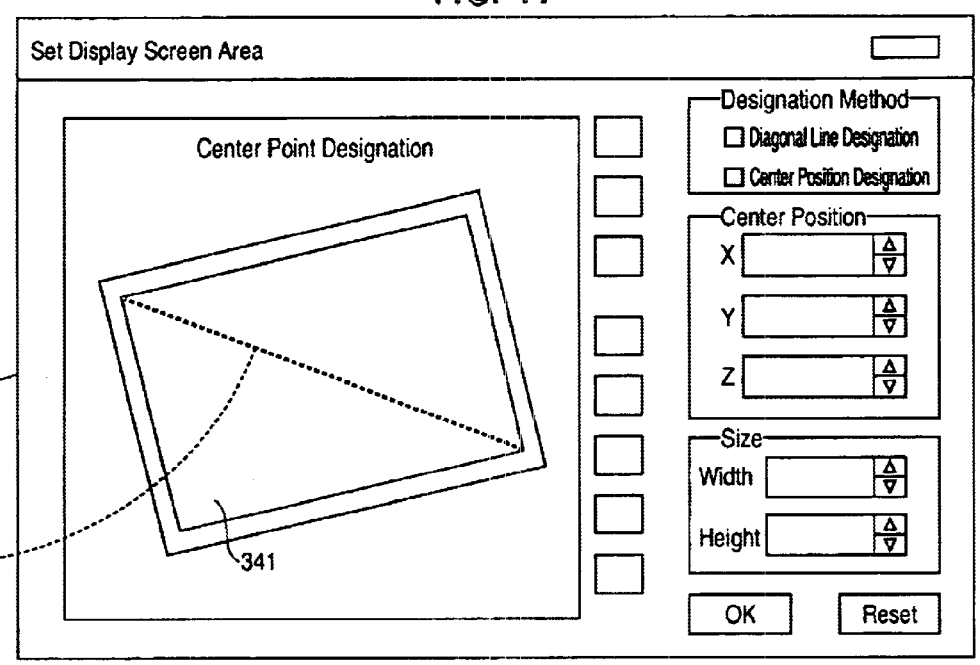
FIG. 17 shows an explanation drawing of a screen for setting the display region.

Now, two modes of "diagonal direction mode" and "center direction mode" are prepared in the screen 340 for setting the display screen range in FIG. 17. Usually, as the display screens have a regulated ratio of longitudinal to lateral length of "4:3" a range of the display 341 is decided by an input of the diagonal line 342 in the diagonal mode by the user. On the other hand, when displays not having the regulated ratio of the longitudinal to the lateral length are used, the user inputs the sizes of the display 341 specifically by using the center mode and decides the range of the display 341 screen of the display of the verification object.

Figure 18:
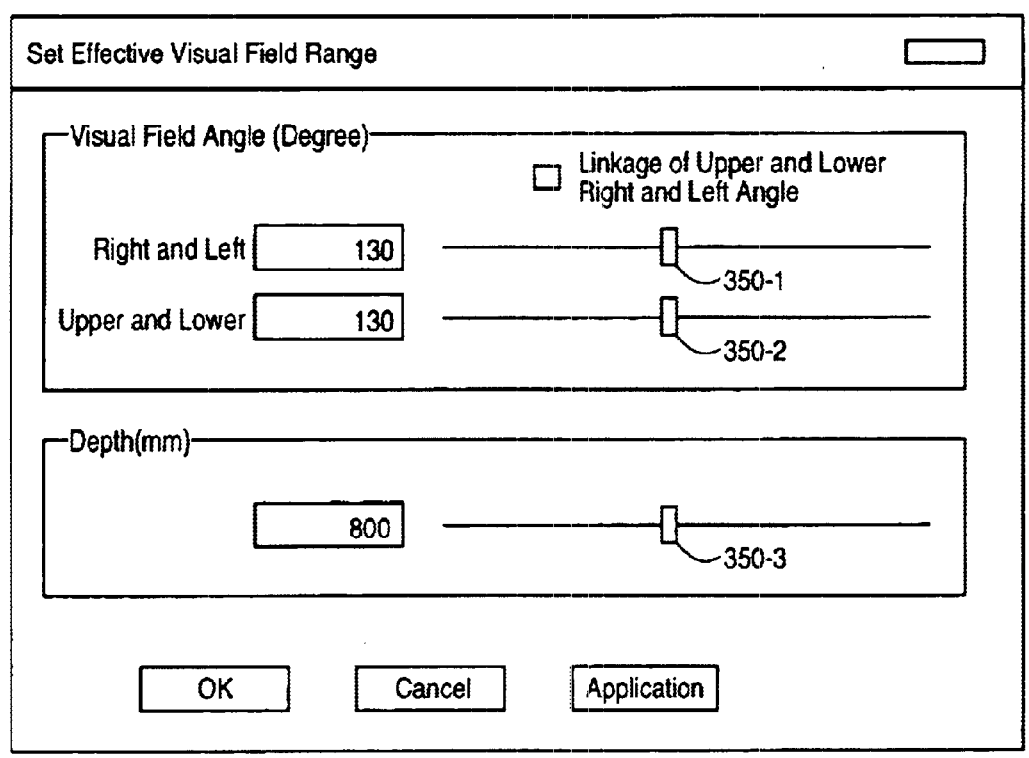
FIG. 18 shows an explanation drawing of a screen for setting an effective visual field range.

Next, a screen 350 for setting the effective visual field range shown in FIG. 18 is set at step ST9 by the request of the user for setting the effective visual field range issued by the user, and dialoguing with the user, the effective visual field range of the display of the verification object is set. At this process, the effective visual field range is set by two times of angle a in the right and left as shown in FIG. 7A, and set two times of the angle β in the upper and lower of FIG. 7B. The displaying length of the effective visual length range is set as the length of the depth (vertical length from the display screen 352). The detail of the set of the effective visual field range is explained by the explanation from step ST28 to step ST37.

Figure 19:
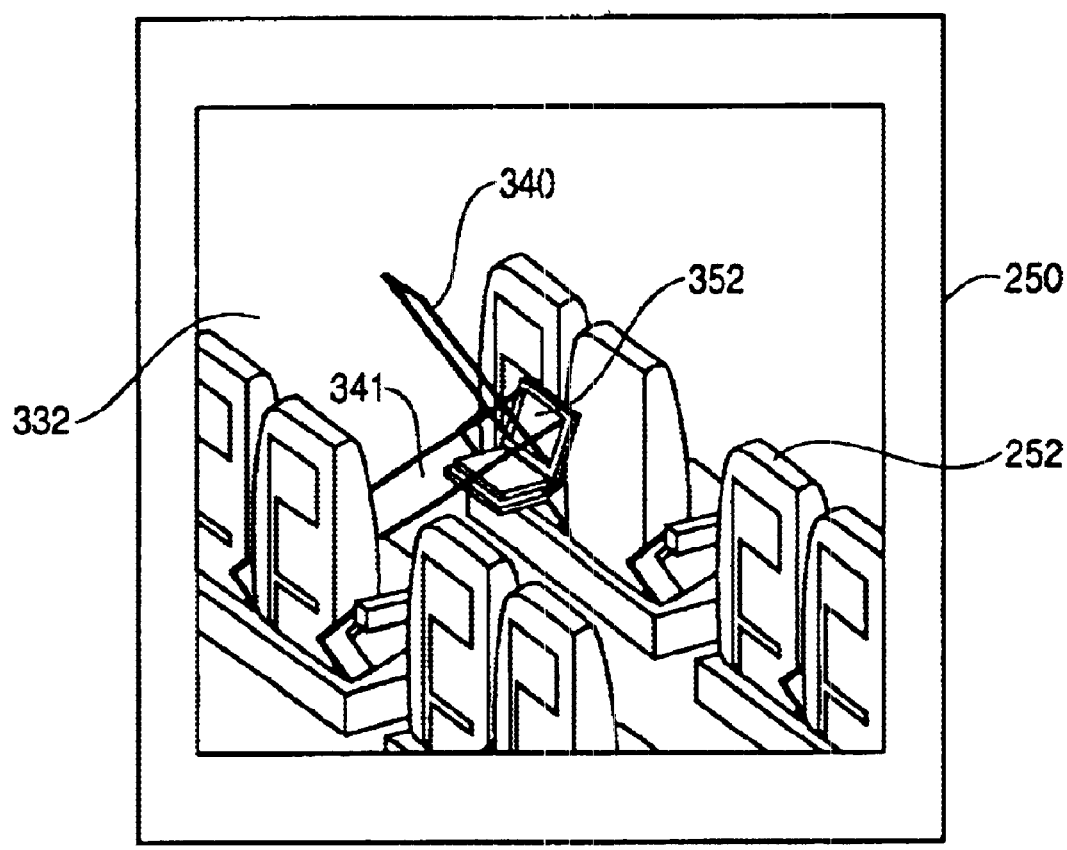
FIG. 19 shows an explanation drawing of a display screen.
Figure 20:
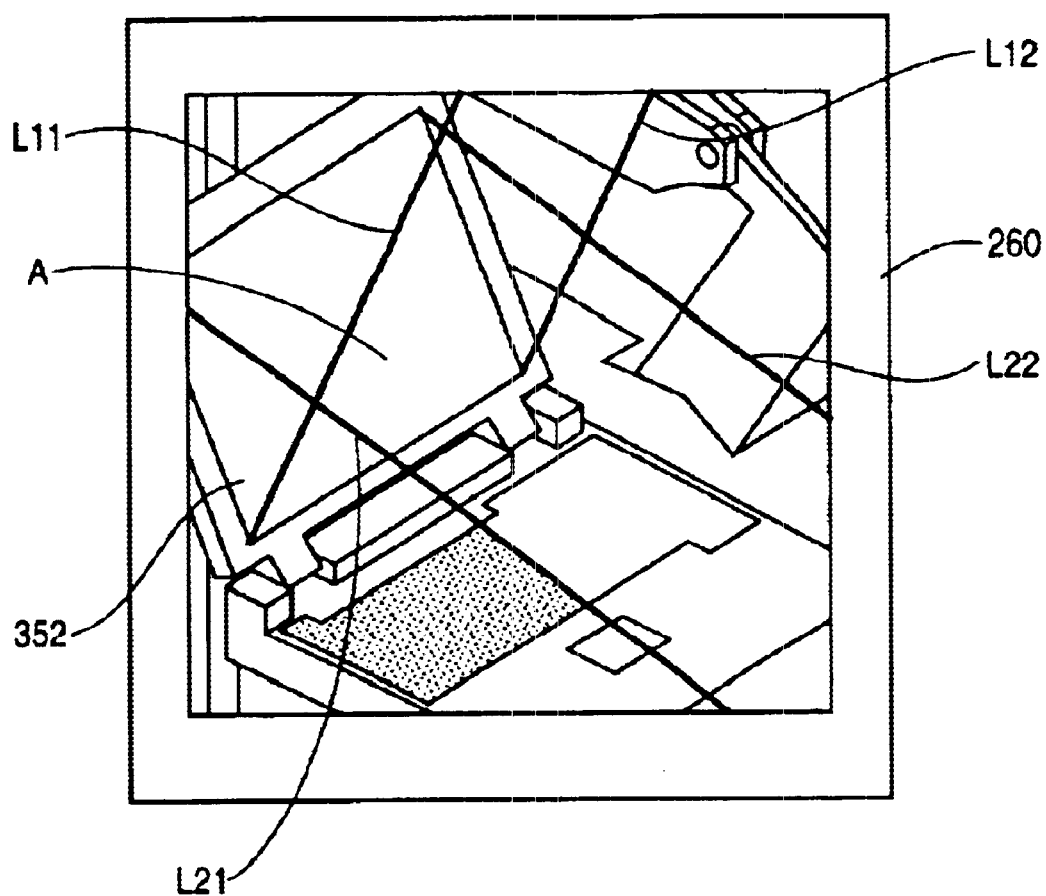
FIG. 20 shows an explanation drawing of a display screen.

Next at step ST10, the set effective visual field range is visually displayed on the composed use environment as shown in FIG. 19 and FIG. 20.

FIG. 19 shows an example of the use environment. It is the use environment of an inside of Shin-kansen train. In FIG. 19, a display 251 of the verification object arranged in the use environment, chair 252, and the use environment 332 are shown.

FIG. 20 shows the display 352 arranged in the use environment 332 in FIG. 19. In FIG. 20, a screen 262 of the display device, the display 352 for verification is shown. FIG. 20 shows the effective visual field of upper and lower direction. L11,L12,L13 and L14 are the boundaries of the effective visual field in the upper and lower direction. A is a screen of the effective visual field.

In FIG. 20, a upper side of a plane made by the line L21 and L22 (plane A1) and a lower side of a plane A1 are displayed by different colors each other. Further, an upper side of a plane made by the line L21 and L22 (plane A1) and a lower side of a plane A1 are displayed by colors different from each other. Further, an upper side of a plane made by the line L11 and L12 (plane A2) and a lower side of a plane A2 are displayed by colors different from each other. All of the colors are different.

The visual display of the effective visual field range is, for example, implemented by a half transparent color. So the area A is displayed by the synthetic color. The user can determine the effective visual field range by the color display. Further, in this embodiment, making the color density thin with the half transparent color of the band thin according to the distance from the display makes it easy for users to see. Alternatively, as another example, changing the color instead of the change of the color density may be accomplished.

The user can understand at a glance the effective visual field of the display 352 in a use environment by the color visual display of the effective visual field range.

Next, at step ST11 (in process flow of FIG. 9) an event input by the user is monitored.

Under the monitor process, when an input of an event is determined, at step ST12 it is determined whether the input event issued is a direction changing the arranged of parts or human body models or not. When the direction is not the direction changing the arranged position of the parts or the human body models, at step ST13, it is determined whether the input event issued is a direction changing the effective visual field range.

According to the determining step ST13, when determining the input event issued is not a direction changing the effective visual field range, at step ST14, it is determined whether the input event issued is a direction displaying the visual image (image of sight of the human body model in the use environment) or not.

According to the determining step, when the input event issued is a direction displaying the visual image, at step ST15, the visual image sight by the human body model arranged in the use environment is generated. Moreover a window for displaying the visual image is opened on the display screen on which the use environment is displayed, and the visual image is displayed thereon. After this, the process returns to the step ST11 to enter into the process for the next input event.

Figure 21:
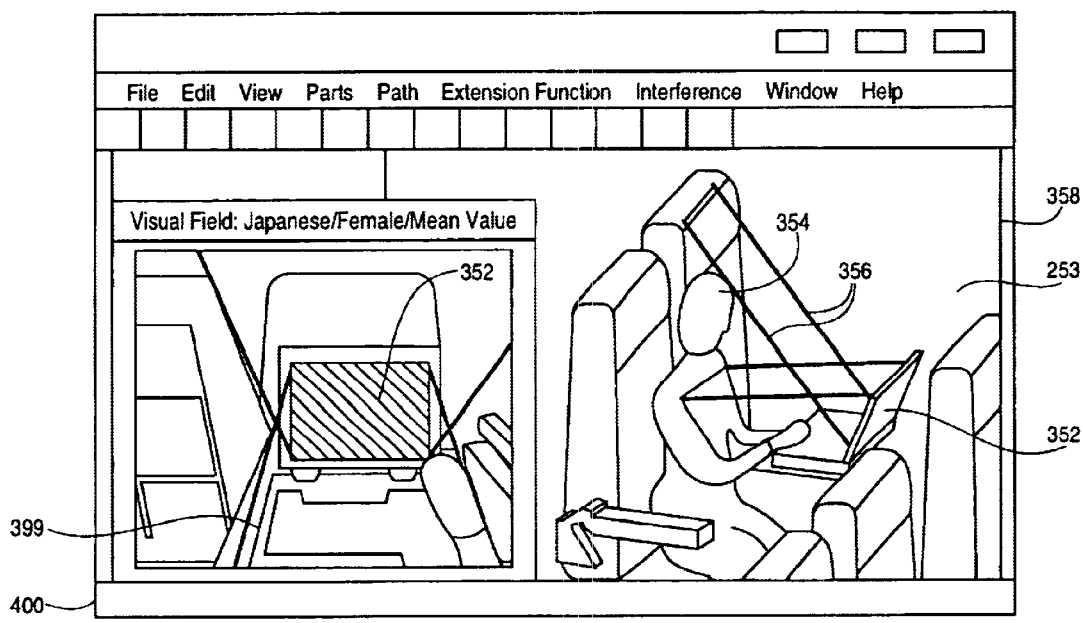
FIG. 21 shows an explanation drawing of a display screen.

In the process, the sight range of the human body model 354 is displayed by the half transparent color radiated in a half conical form from the eyes of the human body model 354 which is shown clearly in the screen 352 of FIG. 21.

In the visual image, a surface or back surface of the band showing the effective visual field is composed by colors (half transparent color) different from each other which is shown in FIG. 21. That is, the color of the band shown from the side of the reference A (half transparent color) and the color of the band shown from the side of the reference B (half transparent color) in FIGS. 6A, 6B, and 6C are different colors from each other. By this, the user can easily know whether the visual image is inside of the effective visual field or outside of the effective visual field by looking at the band of color on the visual field.

Figure 22:
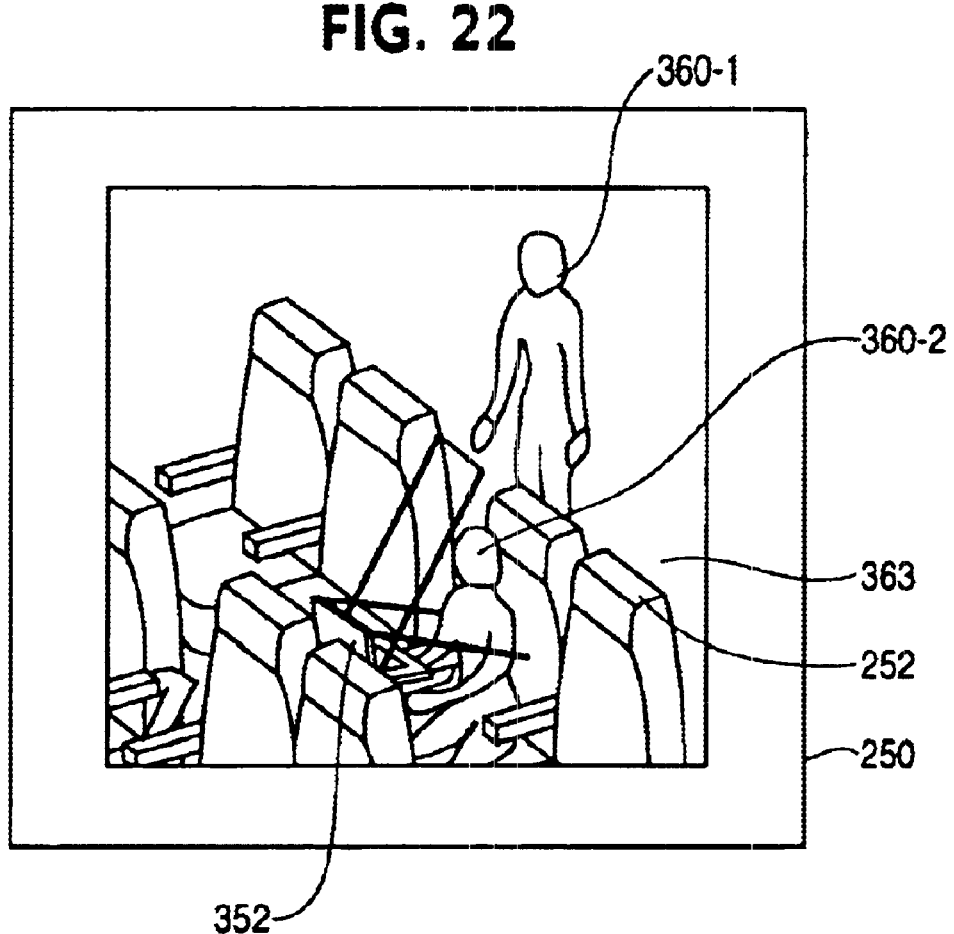
FIG. 22 shows an explanation drawing of a display screen.
Figure 23:
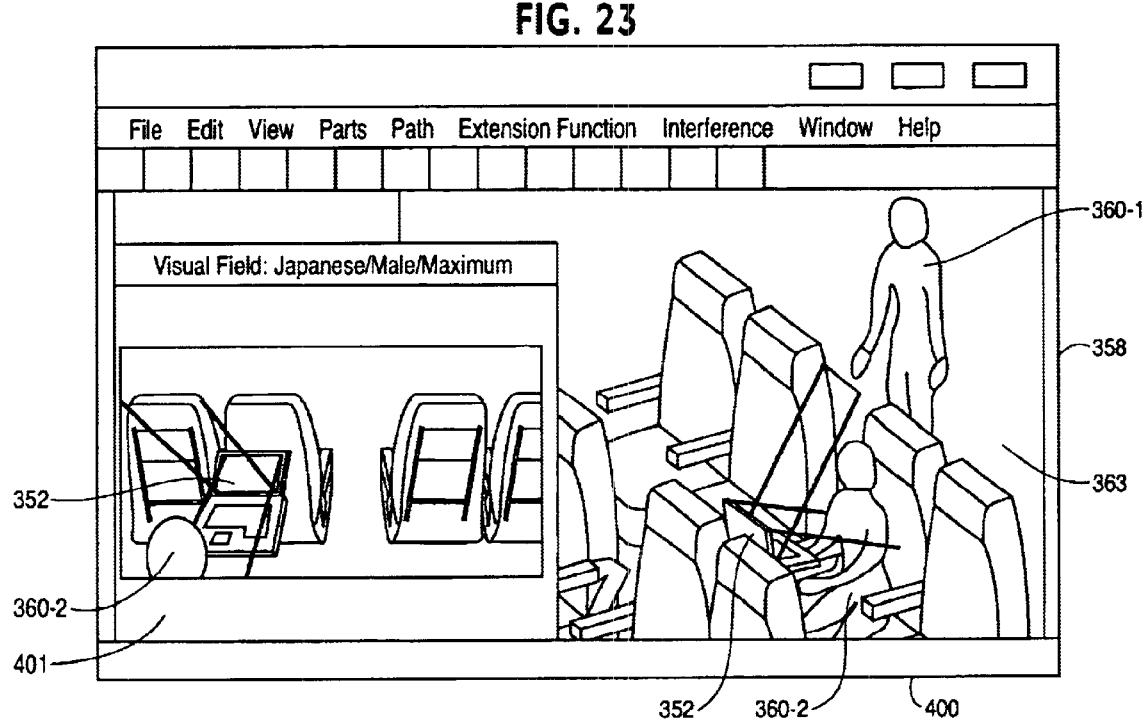
FIG. 23 shows an explanation drawing of a display screen.

As shown in FIG. 22, when plural human bodies model 360-1, 360-2 are arranged in a use environment 363, a human body model directed (clicked) 360-1,360-2 last by a mouse (2a) is set as an operational object, and a visual image seen by the human body model 360-1,360-2 of the operation object is displayed. Like this, when a user wish to see a visual image of another human body model 360-1, 360-2, the user directs (click) the human body model 360-1,360-2 by the mouse 2a. By this, when a user directs the human body model 360-1 standing on the ail shown in FIG. 22 as the operation object, the visual image seen 401 from the human body model 360-1 standing on the ail is displayed on the display screen 358 as shown in FIG. 23.

By the process displaying the visual image, a user can understand easily how a person operating the display device looks the display 352, and can also understand easily how another person looks the display.

On the other hand, when the input event issued is not direction displaying the visual image at step ST14, it is determined at step ST16 whether the input event issued is a direction operating the human body model in the use environment. When it is not the direction operating the human body model, it is determined at step ST17 whether the input event is a direction reserving the layout information (the use environment (322)) or not.

According to the determining process, when the input event issued is not the direction reserving the layout information (use environment), it is determined ST18 whether the input event issued is a direction ending the process or not. When it is a direction ending the process, the process is ended, or, when the event issued is not the direction ending the process, the process returns to the step 11 to process the next event at step 11.

When the input event issued is a direction reserving the layout information (the use environment), the composed layout information is reserved to the layout information file 3 at step ST19, and the process returns to step ST11 for entering another process at step ST11.

Figure 10:
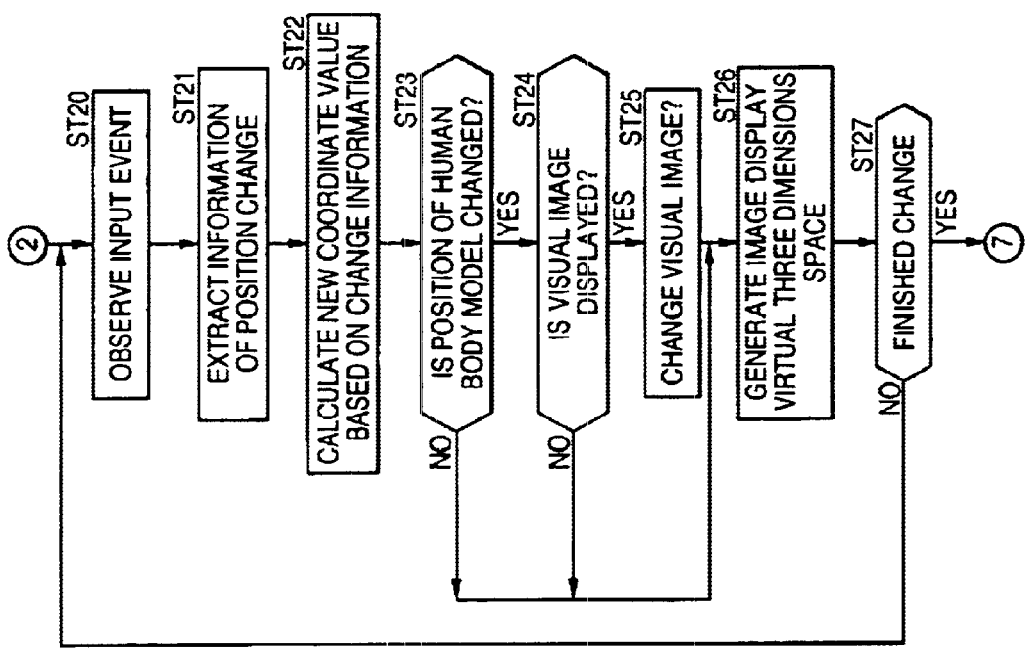
FIG. 10 shows a process flow of a verification program of the effective visual field range.

On the other hand, when, at step ST12, the input event issued is a direction changing the arranged position of parts or human body models (360-1,360-2 in FIG. 22), an input event issued from a user (an input event accompanied with the direction changing the arranged position) is monitored at step ST20 (process flow in FIG. 10). When the input event is issued, the change information of the arranged position of parts and human body models is extracted ST21 from the input event issued.

Next, the new coordinates of the parts and the human body models for changing the arranged position are calculated from the change information of the arranged position extracted at step ST22. Next it is determined at step ST23 whether the direction is the change of the arranged position of the human body model or not. When the direction changing the arranged position of parts and not the human body model, at step ST26, the parts are arranged to the new coordinates to edit the use environment, and then it is displayed on the image screen of the terminal 2.

On the other hand, when the change of the human body model is directed at step ST23, it is determined at step ST24, whether the visual image is displayed or not. When the visual image is displayed, after having changed the visual image according to the change of the arranged position of the human body model at step ST25, and the human body model is arranged at step ST26 according to the new calculated coordinates to edit the use environment, and it is displayed on the display screen of the terminal 2.

So the process at step ST26 is ended, and at next step ST27 it is determined whether ending the changing process of the arranged position is directed or not. When the ending process is not directed, returning to step ST20, the process of the change of the arranged position is continued. Or when the ending is directed, the process returns to step ST11 for entering the next process of the next input event (the process in FIG. 9).

Users can compose the use environment necessary for each user by the process changing the arranged position of parts or human body models from step ST20 to step ST27.

Now, not explained in the process from step ST20 to step ST27, the change of the pose of the parts is processed by the same process. Also the change of the pose of the human body model (for example, 360-1, 360-2 shown in FIG. 23)

is processed by the same process, and the detailed explanation is described later.

Also, not explained in the explanation of process flow from step ST20 to step ST 27, when new parts are added to the use environment (additions of the human body model are explained later), the use environment is edit by deciding the arranged form (position and pose ) of the added parts by the same process.

Figure 24:
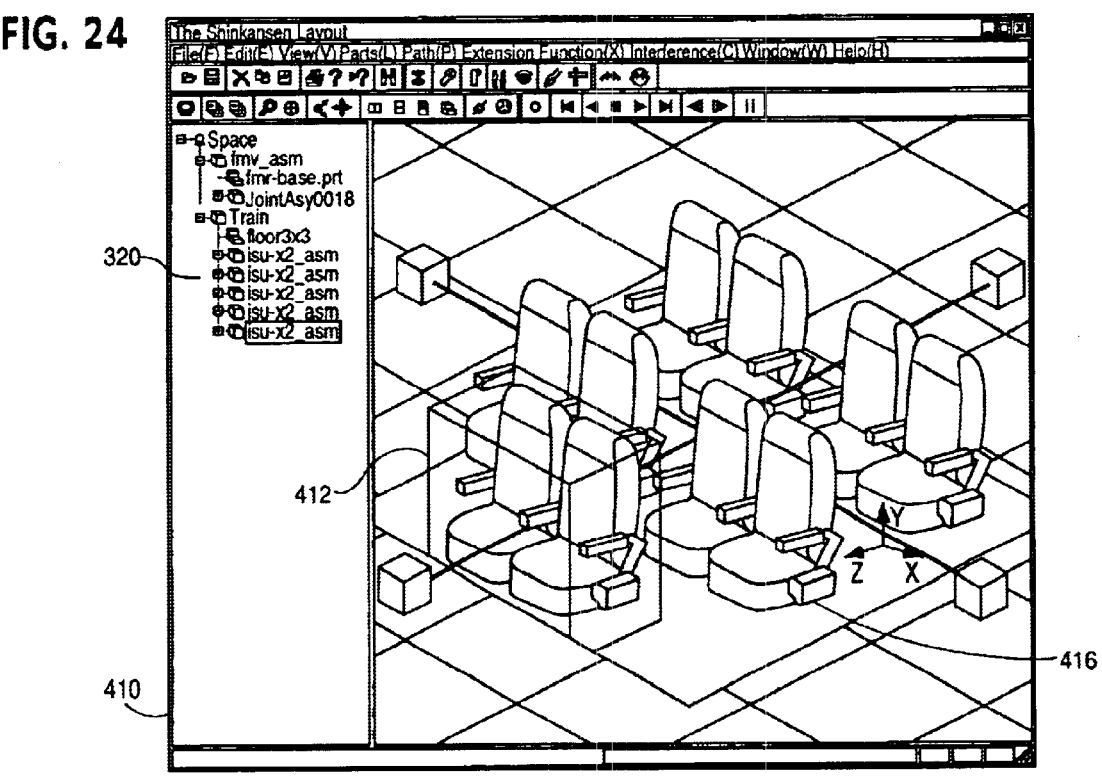
FIG. 24 shows an explanation drawing of a display screen.

That is, displaying a menu (414 in FIG. 24) of all the names of the parts managed in the form information file 4, deciding the added parts by dialoguing with the user, the use environment is edited by deciding the arranging mode of the added parts by interfacing with the user. For example, as shown in FIG. 24, a chair 412 being added (in the case, it can be added by copying), the use environment 416 is edit. Deleting parts or human body models arranged in the use environment can be executed.

Like this, users can compose the use environment(363 in FIG. 22) necessary for each user by changing the arranged position and pose of parts 252 or human body models 360-1,360-2 arranged in the use environment 363, or by adding or deleting parts or human body models arranged in the use environment.

Figure 11:
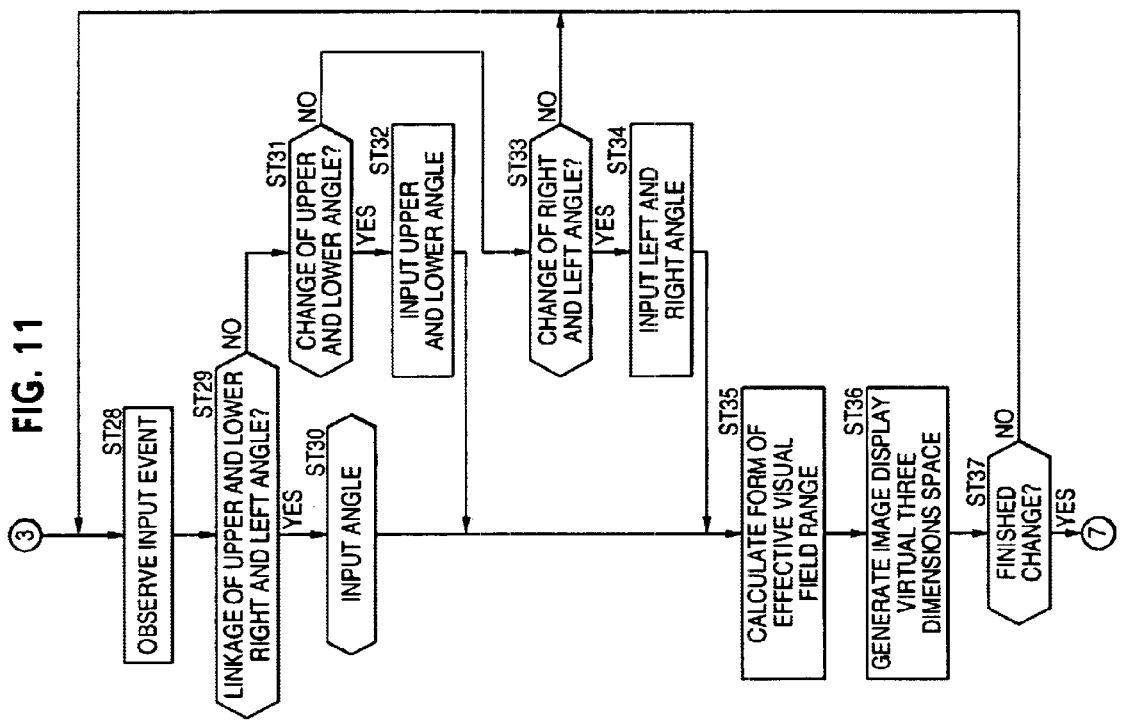
FIG. 11 shows a process flow of a verification program of the effective visual field range.
Figure 12:
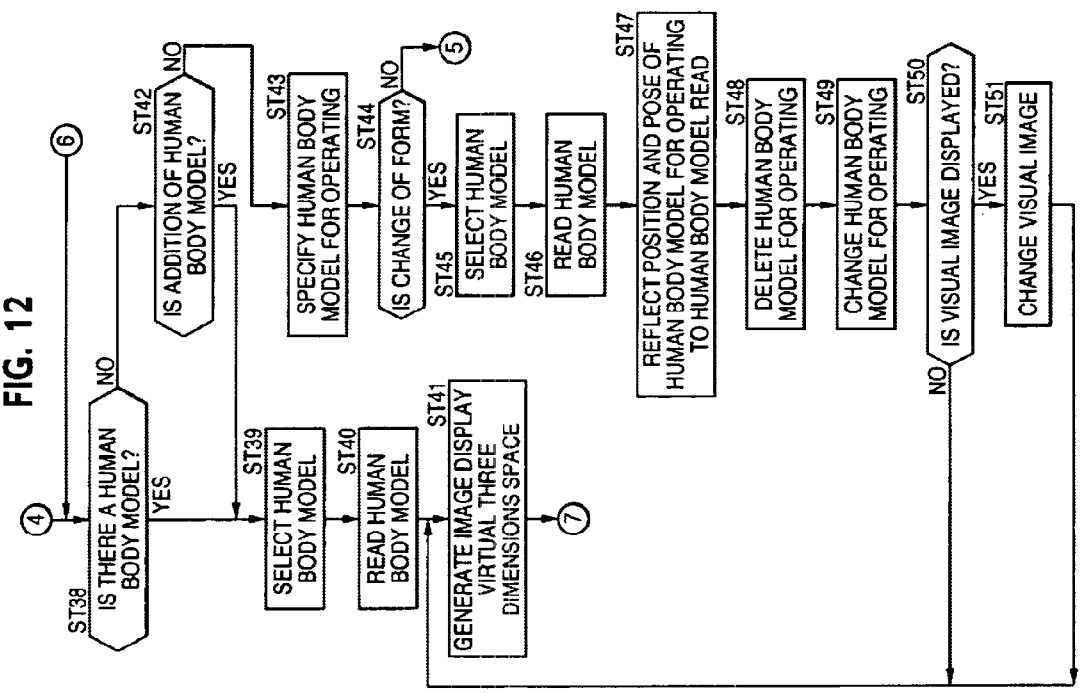
FIG. 12 shows a process flow of a verification program of the effective visual field range.
Figure 13:
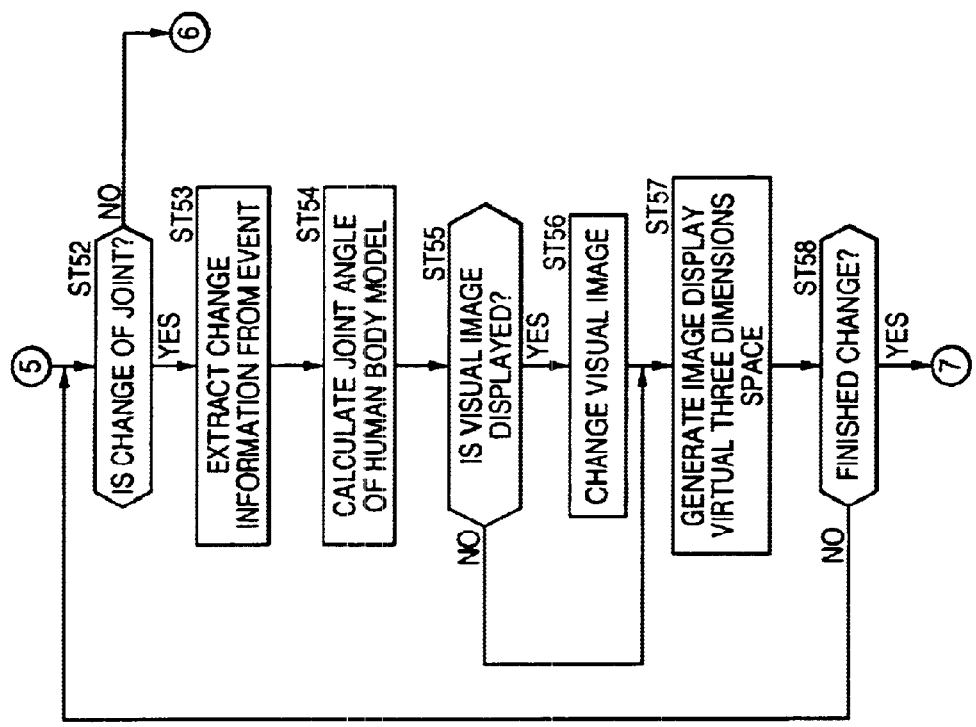
FIG. 13 shows a process flow of a verification program of the effective visual field range.

On the other hand, when the input event issued is a direction changing the effective visual field at step ST13, an input event issued by a user (an input event accompanied to the direction changing an input visual field range) is monitored at step ST28 (process flow chart FIG. 11). That is, when the direction changing the effective field is input by the user, a screen 350 for setting the effective visual field as shown in FIG. 18 is displayed, so that events input from the setting screen 350 by the user are monitored.

When an input event issued is determined at the monitor process, it is determined at next step ST29 whether the input event issued contains an upper and lower angle-right and left angle linkage mode (a mode changing the upper and lower angle-the right and left angle with the same value (see FIG. 7A,7B)). When this mode is direct, angles input by the user is set at step ST30. That is, an angle (right and left angle ($\alpha$) or upper and lower angle ($\beta$)) which is set by a volume for setting angle in a screen 350 for setting the effective visual field range shown in FIG. 18 is input.

On the other hand, when, at step ST29, the input event issued is not the direction of the upper and lower angle-the right and left angle linkage mode (see FIG. 18), it is determined at step ST31 whether the input event issued is the operation of volume for setting upper and lower angles ($\beta$) or not. When the direction of the operation is determined, upper and lower angles ($\beta$) directed by the user are input. That is, the input angle input by the volume (350-1) for setting the upper and lower angle on the screen for setting the effective visual field is entered.

On the other hand, when the input event issued not being, the direction operating the volume for setting the upper and lower angle at step ST31, it is determined whether the input event issued is an operation of the volume (350-2) for setting the right and left angle ($\alpha$) at step ST33. When the direction is not the operation, the process returns to step ST28, or when the direction is the operation, the right and left angle is input entered by the user at step ST34. That is, the input angle set by the volume (350-1) for setting the right and left angle ($\alpha$) on the screen for setting the effective visual field is entered.

Like this, the right and left angle-the upper and lower angle being input (when the input of depth is necessary, the depth is input by the volume 350-3), a form of the effective visual field (a form of the band showing the range of the effective visual field range) is calculated at step ST35, and the calculated effective visual field is displayed visually in the use environment 332 as shown FIG. 19 at step ST36.

Further, finished the process of step ST36, it is determined at next step ST37 whether ending the process for setting the effective visual field is directed or not. When the direction ending the process is not directed, the setting process is continues by returning to the step ST28, and when ending the process direction is directed, the process returns to step ST11 (the process flow in FIG. 9) for processing the next event.

By the process for setting the effective visual field from step ST28 to step ST37 (process flow of FIG. 11), the effective visual field composed by the various form which the user considers is visually displayed, so that the user can investigate the effective visual field of display, considering the use environment .

Figure 25:
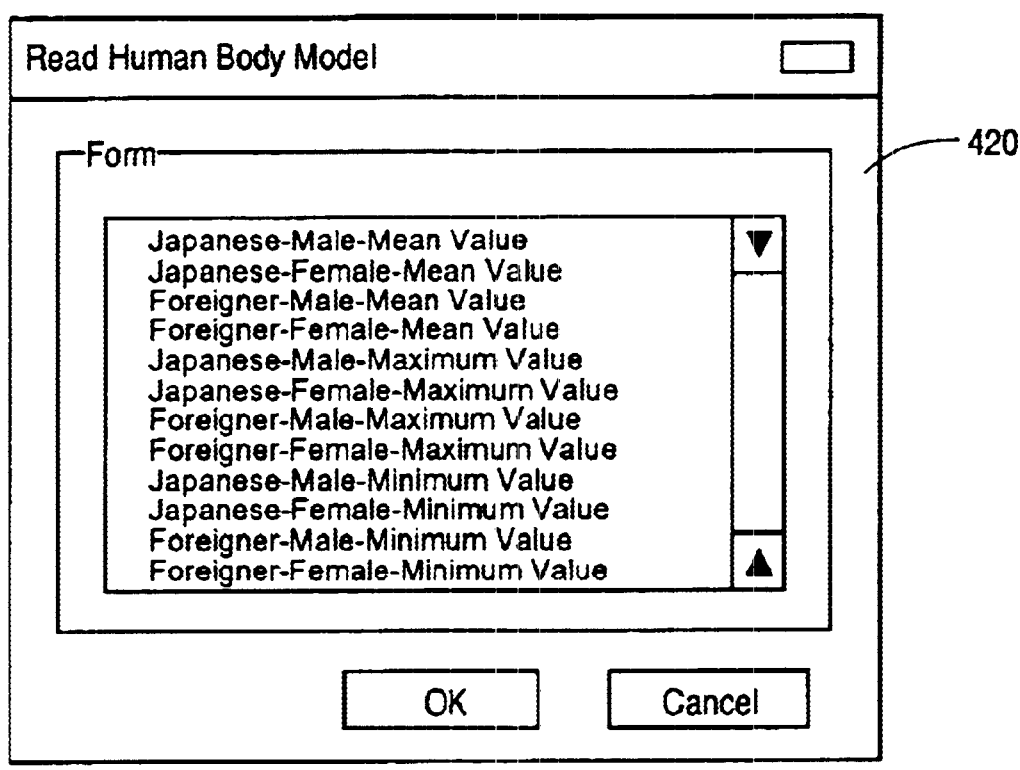
FIG. 25 shows an explanation drawing of a screen for reading out human body models.

On the other hand, when the input event is a direction operating the human body model (360-1,360-2 in FIG. 22) at step ST16, it is determined at step ST38 (the process flow of FIG. 12) whether the human body model (360-1, 360-2 in FIG. 22) is arranged or not in the use environment (332 in FIG. 19). When the human body model is not arranged, a human body model (360-1,360-2) arranged in the use environment (363 in FIG. 22) is chosen by use a screen for reading out a human body model shown in FIG. 25 (displaying the name list of the human body model stored in the human body model information file) by interfacing with the screen 420) with the user.

Next, the selected human body model information (a form information of an upright posture (see 431 in FIG. 26 ) is read from the human body model file 5 at step ST40, and the human body model is arranged to a position directed by the user to edit the use environment. Further it is displayed on a display screen of the terminal 2, and the process returns to step ST11 (the process flow in FIG. 9) for processing the next input event.

On the other hand, when an arrangement of the human body model 360-1,360-2) in the use environment363 is determined at step ST38, it is determined at step ST42 whether the input event issued is the direction adding the human body model or not. When the direction is the add of the human body model, the human body model (3601,360-2) is added in the use environment at step ST39, and displays it in the display screen 255 of the terminal 2.

On the other hand, when the input event issued is not the direction adding the human body model at step ST42, the human body model of the operating object is specified at step ST43. That is, as a human body model (360-1,360-2) operated at the last time is set as an operating object, it is specified. Now, when a human body model (360-1,360-2) is arranged in a use environment 363 in the process at starting time, the human body model (360-1,360-2) of the operating object is decided according to a regulated algorithm.

Next it is determined at step ST44 whether the input event issued is a direction changing the form of the human body model or not, and when the direction is issued, a human body model(360-1,360-2) having the body form changed is chosen at step ST45.

Figure 26:
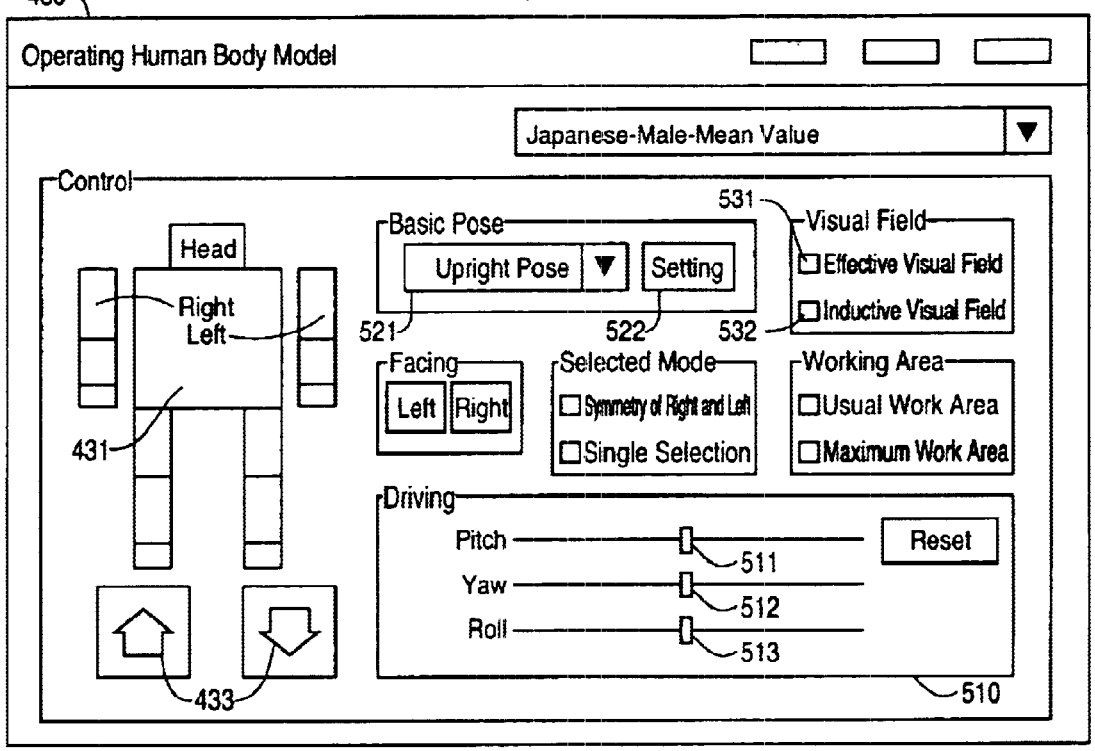
FIG. 26 shows an explanation drawing of a screen for operating human body models.

When the human model (360-1,360-2) is arranged in the use environment 363, a screen for operating the human body model 430 shown in FIG. 26 according to the direction of the user. When the user changes the form of the human body model 431 of the operation object, the user operates buttons (430 etc.) for changing the human body model 360-1,360-2, so that the human body model selected by the changing button is chosen.

Now, as the human body model information read from the human body information file 5 in this example is regularly the upright form 431 (same with a lay down form), the upright form 431 as an initial value in a "fundamental form" on the screen 430 for operating the human body model.

Figure 27:
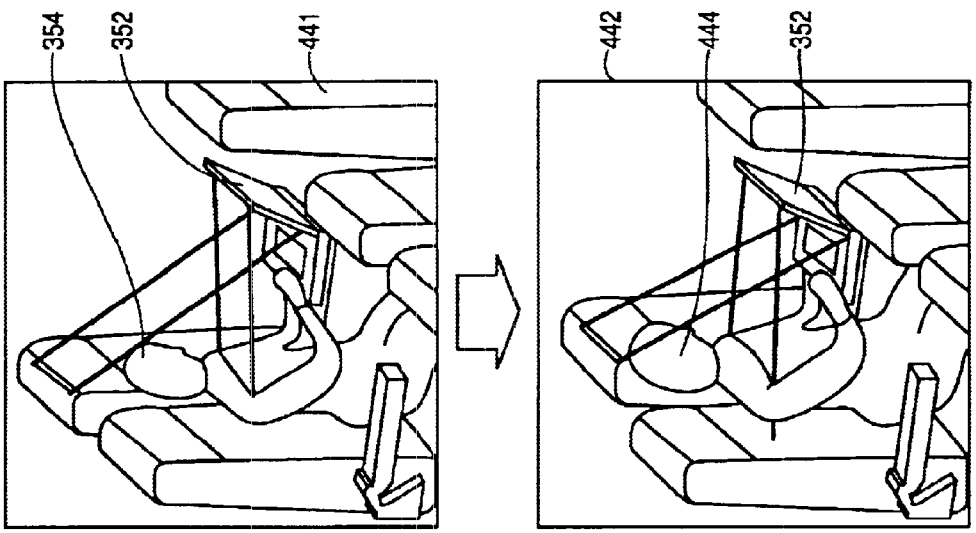
FIG. 27 shows an explanation drawing of the display screen.

Next at step ST46 the form information of the chosen human body model (the form information of the human body model changed the form (see FIG. 25) (the form information of the upright form (see FIG. 27)) is read from the human body model information file 5, and the position and pose of the human body information for the operating object is reflected to the human body model read at next step ST47 (see FIG. 27). That is, at next step ST47, the read position of the human body model is set at the position and pose of the human body for the operating object is set at, and the joint angles of the human body model (selected on the screen of the figure) is set according to the joint angle of the human body model for the operating object (see FIG. 27).

Next at step ST48 the human body model of the operating object (see FIG. 27)is deleted, and at next step ST49 the human body model is changed to the read the human body model at step ST46 by setting it as the human body model of the operating object (see FIG. 27).

Next at step ST50 it is determined whether the visual image is displayed or not, and when the visual image (401 in FIG. 23) is displayed, the visual image 401 is changed according to the change of the form of the human body model (354,444)at step ST51, the use environment 363 is edited by arranging the human body model changed the form in stead of the human body model of the operating object (see FIG. 27), and displayed it on a display screen 441,442 of the terminal 2. On the other hand, when the visual image 401 is not displayed, the process at step ST51 is not processed, and at step ST41 the use environment is edit by arranging the human body model changed the form instead of the human body model of the operating object(see FIG. 27), and displays it on the display screen 441,442 of the terminal 2.

The change of the form can be implemented without changing the position and pose of the human body model as shown in FIG. 27 by the changing process of the form of the human body model (354, 444) from step ST45 to step ST51. By this the user can investigate the effective visual field, considering the various form of persons who use the display device.

On the other hand, when the input event issued is not the direction changing the human body model of the operating object at step ST44, it is determined at step ST52 (process flow of FIG. 13) whether the input event issued is the direction changing the joint angle (pose) of the human body model of the operating object or not. When the direction is not for the change, the process returns to step ST38 (the process flow of FIG. 12), when the direction is for the change, the changing information of the joint angle is extracted from the input event issued at step ST53.

That is, on the operating screen (510) for operating the human body model 360-1,360-2 shown in FIG. 26, a screen for choosing the joints and three volumes (511,512,513) of "Pitch/Yaw/Roll" for setting the joints chosen on the screen. As the user operates the pose of the human body model by the joint selecting screen and the three volumes, the changing information of the input joint angle is extracted.

Now, the change of the pose 431 can be implemented also by operating parts of the human body model (360-1,360-2 in FIG. 22) displayed on the display screen by the mouse 2a without the screen 430 for operating the human body model 431. By this manipulation, the change information of the input joint angle is extracted by the same process.

Next at step ST54, the joint angle of the human body model of the operating object is calculated by the extracted changing information of the joint angle. Next, it is determined at step ST55 whether the visual image (399 in FIG. 21,401 in FIG. 23) is displayed or not. When the visual image 401 is displayed, at next step ST56 the visual image 401 is changed corresponding to the change of the human body model 360-1, at step ST57 the human body model 360-1 changed the pose thereof is arranged to edit the use environment 253,363, and it is displayed on the display screen 400 of the terminal 2. On the other hand, when the visual image (399,in FIG. 21, 401 in FIG. 23) is not displayed, at step ST57 the use environment 402 is edit by arranging the human body model 360-1, changed the pose thereof, and it is displayed on the display screen 400 of the terminal 2.

Further when the process at step ST57 is finished, it is determined at next step ST 58 whether ending the process of the joint angle change is directed or not. When the ending the process is not directed, returning to step ST52, the process of the joint angle change is succeeded, and when ending the process is directed, the process returns to step ST11 (the process of FIG. 9) for processing the next input event.

The pose change of the human body model (360-1,360-2) may be implemented freely by the changing process of the joint angle of the human body model implemented by the process flow from step ST53 to step ST58. By this the user can investigate the effective visual field of various display considering the various poses of persons using the display. But unnatural action is suppressed by the limitation information (see FIG. 3) filed in the layout information file 3.

In the screen 430 for operating the human body model 431 shown in FIG. 26, there is a selection buttons 521 of "fundamental pose" of the management terms in the human body model information (see FIG. 3). These are prepared for reading the joint angle directed by the "fundamental pose" selected by a setting button 523 of the selection button 521 from the human body model information file 5, and for implementing the changing process corresponding to the pose of the human body model 360-1,360-2 of the operation objet.

As an embodiment, an area which the human body model sees is displayed by half transparent colors of conical form (not shown in the figures) radiated from the eyes. A button 531 of "effective visual field" and a button 532 of "inductive visual field" are prepared for changing the size of conical form. That is, when the "effective visual field" 531 is selected, a small conical visual space for showing the range of human watching is displayed, and when the "introduction button" 532 is selected, a large conical visual space for displaying the range of human's looking vacantly is displayed.

Not explained in the above embodiment, as an example, it may be adapted for the brightness of the display to be set (for example 0~100%) by using the screen (350 in FIG. 18) for setting the effective visual field, and to display visually the effective visual field by using colors or brightness according to the set display of the terminal 2 brightness. Adopting the composition of the display composition 2, it makes user's look more comfortably.

The present invention is explained by the embodiments shown in the figures, but the present invention is not limited to the embodiments. In the embodiments, the effective visual field is displayed by the belt, but another displaying way may be adopted.

As explained above, according to the present invention, the use environment 363 of the display 352 of the investigated object is composed in a virtual three-dimensional space to display on the display screen 358, and the effective visual field of the display 352 of the investigated object in the use environment 363 is set to display visually on the screen 358. So users can investigate the effective visual field of the display 352 of the investigated object, considering the real use environment 363.

By adopting the composition, the effective visual field of the display 352 can be set freely, so that the user can investigate in detail the effective visual adapting to the use also.

By these components of the process, as colors and density 352 for displaying visually the effective visual field are changed corresponding to the distance from the display of the investigated object, or the effective visual field is displayed by the colors and density corresponding to the brightness of the display 352 of the verification object, users can determine easily how the display 352 is looked.

And also, by adopting these components, as the use environment 253,363 of the display 352 of the verified object is composed by arranging the human body model 354, the user can investigate specifically the relation between the human body model 354 and the effective visual field.

In the case, operating the arranging position or pose of the human body model 354, and exchanging the human body model 443 without changing the arranging position or pose of the human body model 443, users can investigate the relation between the human body model 354,442 and the effective visual field in detail in various points.

Also by adopting these components of process, as the visual image 358 looked by the human body model 354 is displayed, users can understand how users using the display 352 look the display 352 is determined on sight, and further it is determined also how another persons 360-1 look the display 401 on sight.

In the occasion, as it is clearly displayed whether the visual image 401 is inner of the effective visual field or out of the effective visual field, users can understand immediately the visual image 352 is inner the effective visual field or not.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A verification device of an effective visual field which verifies an effective visual field of a display of a computer, said device comprising:

elements stored in a memory unit to compose a use environment of a display;

composing means for composing an image of the use environment showing virtual-three dimensional space with the elements;

setting means for determining an effective visual field of the display to be verified; and displaying means for displaying the three-dimensional image;

wherein the setting means sets the display in the use environment, and the effective visual field of the display to determine the effective visual field; and displaying means for displaying the use environment, the display and the effective visual field to determine the effective visual field in the use.

2. A verification device of an effective visual field according to claim 1, wherein the effective visual field of the display to be verified is determined with the interactive interface with a user.

3. A verification device of an effective visual field according to claim 1, wherein the displaying means displays the effective visual field with colors or color saturation which is changed according to a distance from the display.

4. A verification device of an effective visual field according to claim 3, wherein the brightness of the colors or color saturation is changed.

5. A verification device of effective visual field according to claim 1, wherein the composing means composes the use environment in which one or plural human body models is arranged.

6. A verification device of effective visual field according to claim 3, comprising:

implementing means for determining the view image of the human body model watching the display to be verified and for displaying the view image, wherein the composing means composes the use environment in which one or plural human body models is arranged, and the position and/or pose of the human body arranged in the use environment is capable of being changed by user operation.

7. A verification device of effective visual field according to claim 2, comprising:

implementing means for determining the view image of the human body model watching the display to be verified and for displaying the view image, wherein the composing means composes the use environment in which one or plural human body models is arranged, and the position and/or pose of the human body arranged in the use environment is capable of being changed by user operation.

8. A verification device of effective visual field according to claim 3, comprising:

implementing means for determining the view image of the human body model watching the display to be verified and for displaying the view image, wherein the composing means composes the use environment in which one or plural human body models is arranged, and the position and/or pose of the human body arranged in the use environment is capable of being changed by user operation.

9. A verification device of effective visual field according to claim 4, comprising:

implementing means for determining the view image of the human body model watching the display to be verified and for displaying the view image, wherein the composing means composes the use environment in which one or plural human body models is arranged, and the position and/or pose of the human body arranged in the use environment is capable of being changed by user operation.

10. A verification device of effective visual field according to claim 6, wherein the composing means exchanges the form of the human body models without changing the position and/or pose of the human body arranged in the use environment according to user operation.

11. A verification device of effective visual field according to claim 7, wherein the composing means exchanges the form of the human body model without changing the position and/or pose of the human body arranged in the use environment according to user operation.

12. A verification device of effective visual field according to claim 9, wherein the composing means exchanges the form of the human body model without changing the position and/or pose of the human body arranged in the use environment according to user operation.

13. A verification device of effective visual field according to claim 9, wherein the composing means exchanges the form of the human body model without changing the position and/or pose of the human body arranged in the use environment according to user operation.

14. A verification device of effective visual field according to claim 6, wherein the implementing means displays the view field image, showing explicitly an inner range of the effective visual field and an outer range of the effective visual field of the display to be verified.

15. A verification device of effective visual field according to claim 7, wherein the implementing means displays the view field image, showing explicitly an inner range of the effective visual field and an outer range of the effective visual field of the display of the verification object.

16. A verification device of effective visual field according to claim 8, wherein the implementing means displays the view field image, showing explicitly an inner range of the effective visual field and an outer range of the effective visual field of the display of the verification object.

17. A verification device of effective visual field according to claim 9, wherein the implementing means displays the view field image, showing explicitly an inner range of the effective visual field and an outer range of the effective visual field of the display of the verification object.

18. A verification method of an effective visual field for a display of a computer comprising:

storing elements in a memory unit to compose a use environment of a display to be verified;

composing an image of the use environment showing virtual-three dimensional space with the elements;

setting the display and the effective visual field of the display in the environment;

displaying the environment, the display and the effective visual field in the environment, and determining the effective visual field of the display.

19. A verification method according to claim 18 comprising:

arranged one or plural human body models, and the position and/or pose of the human body arranged in the use environment being capable of being changed by user operation;

determining the view image of the human body model watching the display, and;

displaying the view image.

20. A verification method according to claim 18:

wherein the effective visual field of the display is determined with interactive interface with a user.

21. A verification method according to claim 18:

wherein the displayed colors or color saturation is changed according to a distance from the display.

22. A verification method according to claim 21:

wherein the displaying brightness of the colors or color saturation is changed.

23. A verification method according to claim 19:

wherein the effective visual field of the display is determined with interactive interface with a user.

24. A verification method according to claim 19:

wherein the displayed colors or color saturation is changed according to a distance from the display.

25. A verification method according to claim 24:

wherein the displaying brightness of the colors or color saturation is changed.

26. A medium storing a program for verifying an effective visual field of a display, said program, when executed by a computer, directing the computer to execute the operations comprising:

storing elements in a memory unit to compose a use environment of a display to be verified;

composing an image of the use environment showing virtual-three dimensional space with the elements;

setting the display and the effective visual field of the display in the environment;

displaying the environment, the display to be verified and the effective visual field in the environment, and determining the effective visual field of the display.

27. A medium according to claim 26 comprising:

one or plural human body models being arranged, and the position and/or pose of the human body arranged in the use environment being capable of being changed by user operation;

determining the view image of the human body model watching the display to be verified, and;

displaying the view image.

28. A verification device of an effective visual field which verifies an effective visual field of a display, said device comprising:

elements stored in a memory unit to compose a use environment of a display to be verified;

a composing unit composing the use environment in a virtual-three dimensional space with the elements;

a setting unit determining an effective visual field of the display in the environment;

a displaying unit displaying the three-dimensional image;

wherein the setting means sets the display and the effective visual field of the display in the use environment composed by the composing means; and the displaying unit displaying the environment, the display and the effective visual field in the environment determined by the setting unit on the display.

* * * * *

UNITED STATES PATENT AND TRADEMARK OFFICE
CERTIFICATE OF CORRECTION

PATENT NO. : 6,683,610 B1
DATED : January 27, 2004
INVENTOR(S) : Naoyuki Nozaki

It is certified that error appears in the above-identified patent and that said Letters Patent is hereby corrected as shown below:

Column 16,
Line 25, change "3" to -- 1 --.

Column 17,
Line 11, change "9" to -- 8 --.
Line 50, change "," to -- ; --.
Line 59, change ", and;" to -- ; and --.

Column 18,
Line 22, delete "the" (second occurrence).
Line 35, change "the" to -- a --.
Line 40, change ", and;" to -- ; and --.

Signed and Sealed this

Twenty-fifth Day of May, 2004

JON W. DUDAS
*Acting Director of the United States Patent and Trademark Office*